Sept. 22, 1931.   A. J. KERCHER ET AL   1,824,155
WATER SUPPLY HEATER

Original Filed Feb. 27, 1928

INVENTORS
William Wesley Hicks
BY Arthur J. Kercher
ATTORNEYS

Patented Sept. 22, 1931

1,824,155

UNITED STATES PATENT OFFICE

ARTHUR J. KERCHER, OF BERKELEY, AND WILLIAM WESLEY HICKS, OF SAN FRANCISCO, CALIFORNIA, ASSIGNORS TO WESIX NATIONAL COMPANY, OF SAN FRANCISCO, CALIFORNIA, A CORPORATION OF DELAWARE

WATER SUPPLY HEATER

Application filed February 27, 1928, Serial No. 257,528, and in Great Britain April 28, 1926. Renewed April 14, 1931.

This invention relates generally to devices intended to be incorporated with water piping systems for heating water supplied to faucets. It is particularly adapted for domestic use where the hot water demands are varied from time to time.

It has previously been proposed to incorporate a fuel or electric heater with a storage tank, so that a considerable quantity of heated liquid may be stored for supplying hot water faucets. These tanks are generally in continuous communication with a source of cold water under pressure, and frequently the heater is controlled by thermostat means to keep the heater in operation except when the entire tank of water is heated to a certain predetermined temperature. When such heaters are employed for domestic purposes, considerable loss of efficiency results from the fact that during certain periods, the demands of the consumer do not require a large quantity of stored heated liquid, while at other times, as when it is desired to employ hot water for laundry or bath purposes, the entire heated contents of the tank are desirable. To make the use of these heaters more economical, it has been proposed to limit thermal circulation thru the tank, so that by controlling a suitable device, an operator may heat only a portion of the tank during periods when only a small quantity of hot water need be kept ready for use.

While prior systems of the kind mentioned above give satisfactory results under certain conditions of operation, they are not as economical as might be desired due to the fact that when only a small quantity of water is being heated this quantity of water is in thermal contact with the unheated water. Furthermore systems of this kind cannot be readily incorporated with prevailing types of water heaters.

It is an object of this invention to generally improve upon the construction of water heaters by providing separate segregated storage tanks of different volumetric content, which are so related to the water supply system as to be capable of being heated from a single source of heat, and which may be controlled by an operator in a simple manner so that either a relatively large quantity or a small quantity of liquid may be heated as desired.

Further objects of the invention will appear from the following description in which we have set forth the preferred embodiment of our invention. It is to be understood that the appended claims are to be accorded a range of equivalents consistent with the state of the prior art.

A different specific embodiment of the subject matter of the claims was disclosed in applicants' co-pending application, Serial No. 712,434, filed May 10, 1924 and this application is a continuation of the same so far as the subject matter of the claims is concerned and is entitled to the filing date of that application to that extent.

Referring to the drawings.

Figure 1:
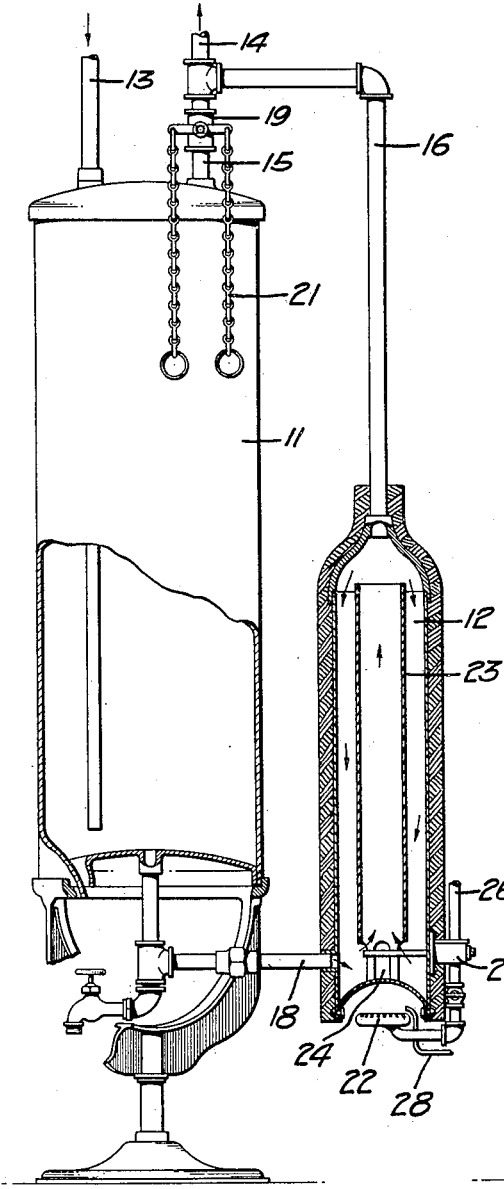
Figure 1 is a side elevational view partly in cross section, illustrating a water heater constructed in accordance with this invention.

Referring first to Fig. 1, we have shown two separate storage tanks 11 and 12, arranged side by side, the tank 11 being preferably of much larger volume than the tank 12. Both tanks are enclosed, and tank 11 is in communication with a source of cold water under pressure, as for example the cold water pipe 13, this pipe preferably extending and discharging into the lower portion of tank 11. Pipe 14 connects to the faucets to be supplied with hot water and the upper portion of tank 11 is in communication with pipe 14 by means of pipe 15. Correspondingly the upper portion of tank 12 is in communication with pipe 14 thru pipe 16. When pipes 15 and 16 are in communication, communication is established between the upper portions of tanks 11 and 12. Communication is also provided between lower portions of these tanks, as by means of piping 18. Inserted in pipe 15, preferably between tank 11 and the point of communication between pipes 14 and 16, there is a valve 19 which may be conveniently manually operated, as by means of chains 21. When valve 19 is open communication is established between pipes 15 and 16 and the discharge pipe 14, and when valve 19 is closed, communication is interrupted between pipe 15 and pipe 14, but communication is still permitted between pipes 14 and 16.

For heating water in both tanks, we provide a single heating element represented in this instance by the fuel burner 22, we prefer also to associate this burner with the small tank 12 as shown. In order to aid in quickly heating all of the water in tank 12 to a certain temperature, we prefer to provide baffle means for guiding convective currents of water, as is provided by means of a tubular baffle member 23 which extends upright within the tank 12. Member 23 is preferably provided with passages or openings 24 in its lower portion, so that fluid may pass upwardly thru the same and circulate downwardly between member 23 and the adjacent side walls of tank 12.

Gas or other suitable fuel is supplied to a burner 22 thru a supply pipe 26, and the supply of fuel is controlled by means of a thermostat 27, this thermostat being in thermal contact with the lower portion of tank 12 and therefore responsive to the temperature of the liquid in the lower portion of tank 12. As will be presently explained this thermostat 27 controls the supplying of heat both when it is desired to heat a large quantity of water, and when only a small quantity is to be stored.

In explaining the operation of the heater, it will be presumed that both tanks 11 and 12 contain cold water, and that it is desired to heat only a small quantity of water and keep such a small quantity continuously heated so as to be available at any time desired. Valve 19 is then manually closed so as to prevent any thermal circulation between tanks 11 and 12. Therefore as heat is supplied by burner 22, the heated water is forced to circulate within tank 12 and cannot circulate into tank 11. Within a short time the water within tank 12 will be heated to the desired maximum temperature, after which the supply of fuel will be regulated or interrupted by the thermostat switch 27. When a faucet attached to pipe 14 is opened heated liquid is withdrawn from tank 12 to the exclusion of tank 11, and cold liquid enters tank 12 thru pipe 18. Since thermostat 27 is responsive to temperature changes of the water, it immediately controls the supplying of heat so as to again heat the water in tank 12 to the desired maximum temperature. It is of course apparent where thermostat 27 entirely interrupts the supply of fuel or gas to burner 22 upon the water reaching a certain maximum, it is necessary to provide a suitable pilot burner 28.

When it is desired to provide a relatively large quantity of heated liquid, greater than the volumetric content of tank 12, then valve 19 is opened manually to permit a thermal circulation between tanks 11 and 12. The water as it is heated in tank 12 will now immediately rise thru pipe 16 and pass down thru pipe 15 into the tank 11, while cold water from tank 11 will flow from the lower portion of the same thru pipe 18 into the lower portion of tank 12. As long as all the water in tank 11 has not been heated to a certain maximum temperature, the thermostat 27 will not interrupt supplying of heat to tank 12. However, when the water in tank 11 has been heated to a certain maximum temperature, the water in the lower portion of tank 12 is likewise heated to such a temperature as to cause thermostat 27 to interrupt or decrease the supplying of heat. Now if hot water is withdrawn thru pipe 14, cold water will flow into tank 11 thru pipe 13 to take the place of the heated liquid withdrawn. In withdrawing heated liquid thru pipe 14 while valve 19 is open, substantially all of the heated liquid will be withdrawn from tank 11 rather than from tank 12. This may be explained by the fact that from the point of discharge of pipe 13, the water may flow along two paths, one path being thru tank 11 and pipe 15, and the other path thru pipe 18, tank 12, and pipe 16. The path provided by pipe 18, and tank 12 and pipe 16, is materially longer than the path provided by tank 11 and pipe 15, and therefore offers considerably more resistance to flow of water. For this reason when valve 19 is open, substantially all of the heated liquid withdrawn will be withdrawn from the large tank 11, while only small proportions will be withdrawn from tank 12. When no further water is withdrawn, circulation of liquid between tanks 11 and 12 will continue to again heat the water in tank 11 to the desired maximum temperature.

Figure 2:
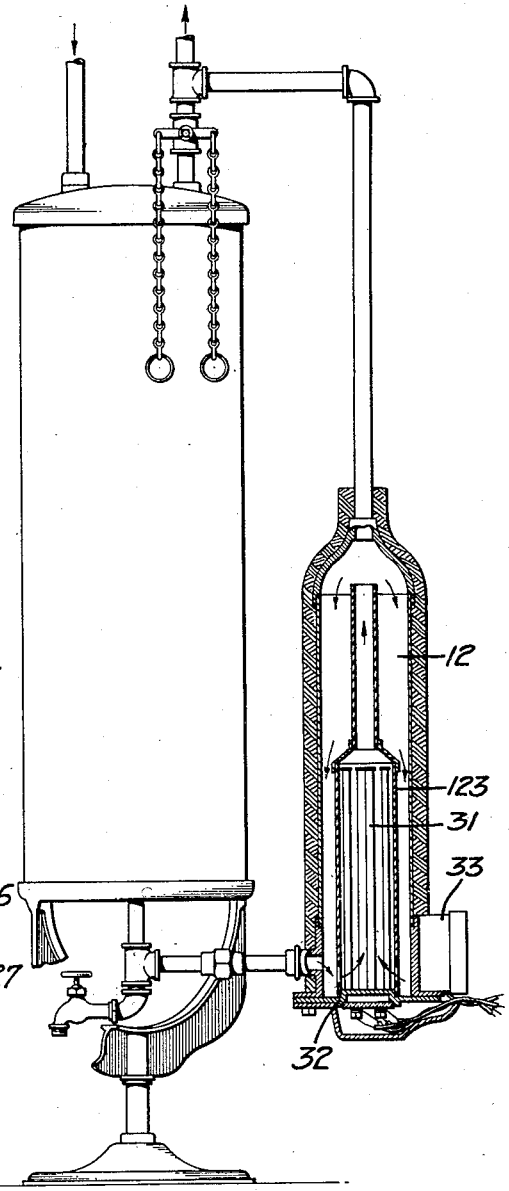
Fig. 2 is a view similar to Fig. 1, showing a modification of the heater.

In Fig. 2 we have shown a modification of the heater shown in Fig. 1, in which an electrical source of heat is provided rather than a fuel burner. In this case we have shown a plurality of electrical heating elements 31, preferably carried by a header 32, this header being removably secured to the lower portion of tank 12. The tubular baffle member 123, corresponding to baffle member 23 of Fig. 1, surrounds the heating elements 31 so as to provide for thermal circulation within tank 12. The current supplied to the heating elements in this case is controlled by means of a thermostat switch 33, the thermostat element of this switch being in thermal contact with the lower portion of tank 12. The operation of this heater is substantially the same as the operation of the heater described above.

It is obvious that we have provided a heater having considerable utility and which may be cheaply manufactured and installed. The consumption of fuel or electricity is relatively low, due to the fact that the operator may heat a small or large quantity of water depending upon the demand. When a small quantity of water is kept heated in tank 12, it may be kept at a relatively high temperature without employing an excessive amount of heat, due to the fact that tank 12 is entirely isolated and arranged to one side of tank 11. It is also to be noted that we have provided a single source of heat for maintaining heated water in either one of the two tanks, and have provided a single thermostat for controlling the single source of heat for both tanks.

We claim:

1. A heater for maintaining varied quantities of hot water for supplying hot water faucets comprising a pair of isolated water storage tanks, one tank being substantially larger than the other, means for supplying heat to the liquid in the small tank, piping connecting the lower portions of said tanks, a cold water supply pipe communicating with the large tank, a hot water discharge pipe, piping connecting the upper portion of said large tank and said discharge pipe, piping connecting the upper portion of said small tank and said discharge pipe, thermostat means responsive to the temperature of the water in the lower portion of the small tank to control the supply of heating medium to the heating means of the small tank, and valve means interposed in the piping between the hot water discharge pipe and the large tank and controlling the circulation of water between said tanks.

2. A heater for maintaining varied quantities of hot water for supplying hot water faucets comprising a pair of isolated water storage tanks, one tank being substantially larger than the other, means for supplying heat to the liquid in the small tank, a cold water supply pipe communicating with the large tank, a hot water discharge pipe, means including piping connecting said tanks together for forming a thermal circulation path for flow of water between the tanks, and for connecting the hot water discharge pipe with the upper portion of the small tank, thermostat means responsive to the temperature of the water in the small tank to control the supply of heating medium to the heating means of the small tank, and valve means interposed in said piping between said hot water discharge pipe and said large tank and controlling the circulation of water between said tanks.

3. A heater for maintaining varied quantities of hot water for supplying hot water faucets, comprising a pair of separate tanks, one tank being substantially larger than the other, the smaller of said tanks being of sufficient size to store a substantial quantity of hot water, means for supplying heat to the water in the small tank, piping connected to said tanks, said piping forming together with said tanks a closed path for thermal circulation of water which has communication with a cold water supply pipe and a hot water discharge pipe, valve means interposed in said path having a member movable to one position for effecting interruption of circulation thru said path without interrupting communication of the small tank with the cold water supply pipe and the hot water discharge pipe, whereby water removed thru the hot water discharge pipe flows from the small tank to the exclusion of the large tank, said member being movable to another position in which thermal circulation thru said path is permitted to heat a relatively large quantity of stored water in the large tank, and a temperature responsive device associated with said path for controlling the supply of heating medium to said means for supplying heat at either one of the two positions of said member.

In testimony whereof, we have hereunto set our hands.

WILLIAM WESLEY HICKS.
ARTHUR J. KERCHER.